United States Patent
Parr

[15] 3,700,094
[45] Oct. 24, 1972

[54] VIBRATORY FEEDER BOWL DRIVE APPARATUS

[72] Inventor: Michael K. Parr, 5169 East State Street, Apt. 211, Building 3, Rockford, Ill. 61108

[22] Filed: Aug. 2, 1971

[21] Appl. No.: 168,328

[52] U.S. Cl............................................198/220 BC
[51] Int. Cl..............................................B65g 27/00
[58] Field of Search........198/220 A, 220 AB, 220 BC

[56] References Cited

UNITED STATES PATENTS

| | | | |
|---|---|---|---|
| 2,821,292 | 1/1958 | Spurlin | 198/220 |
| 3,258,111 | 6/1966 | Spurlin | 198/220 |
| 3,587,833 | 6/1971 | Byrun | 198/220 |

*Primary Examiner*—Richard E. Aegerter
*Attorney*—McCanna, Morsbach, Pillote & Muir

[57] ABSTRACT

A feeder bowl drive apparatus for imparting angular and axial vibratory movement to a parts feeder bowl in which a feeder bowl support is resiliently mounted on the base by a leaf spring assemblies angularly spaced about the axis of the feeder bowl. The springs are adjustably mounted on the base to enable adjustment of the effective length of the spring for tuning of the natural frequency of vibration of the vibratory body and the leaf spring mountings on the base and on the bowl support are self-aligning with the leaf springs to avoid introduction of nonuniform spring tensions in the leaf springs.

10 Claims, 6 Drawing Figures

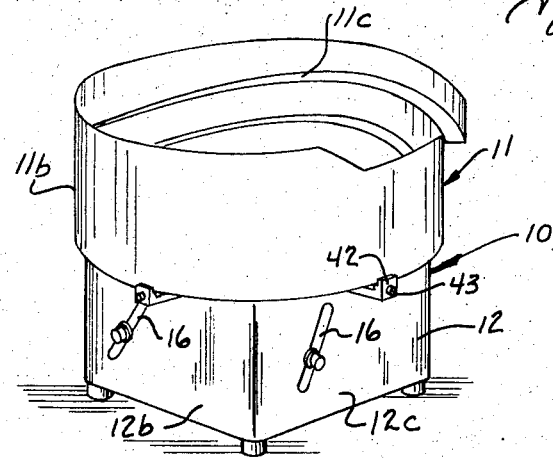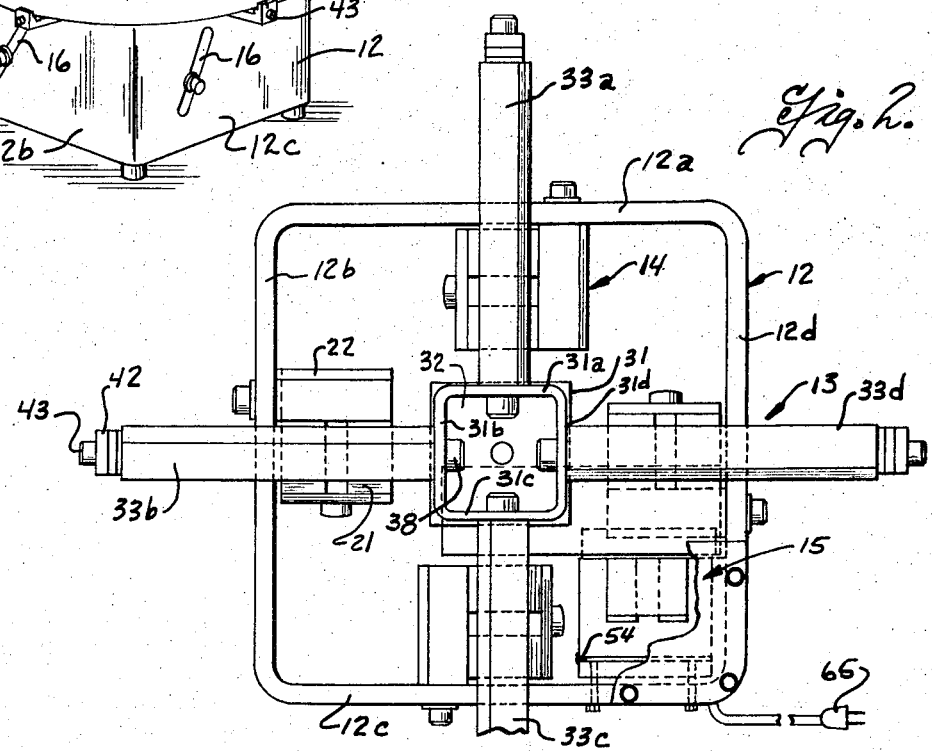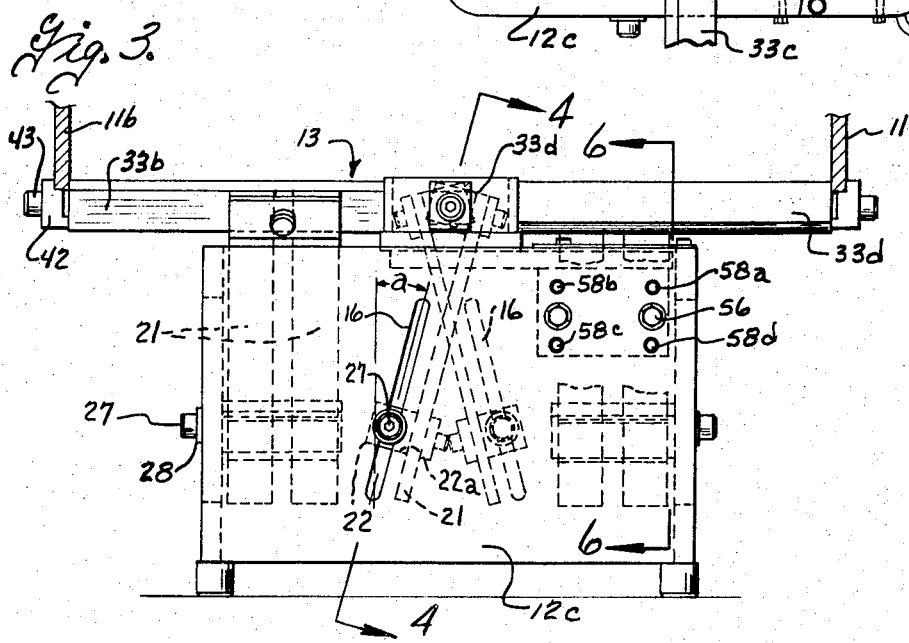

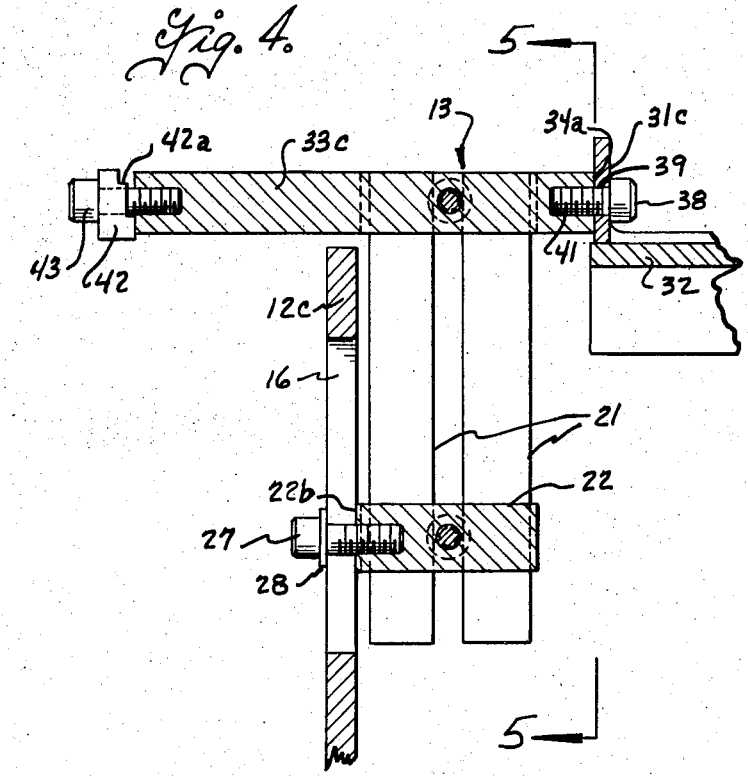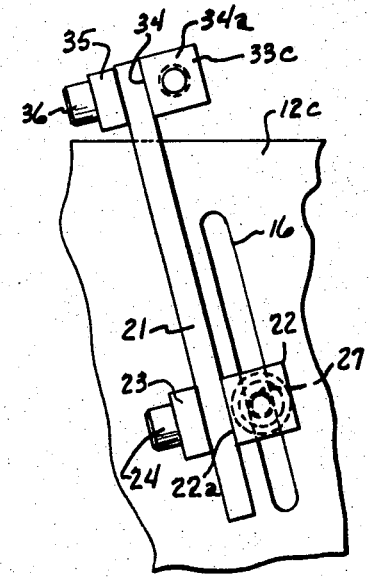

VIBRATORY FEEDER BOWL DRIVE APPARATUS

BACKGROUND OF THE INVENTION

The vibratory drive apparatus is utilized for imparting angular and axial vibratory movement to parts feeder bowls used to feed, orient, untangle, blend or sort small parts for manufacturing operations such as assembly, inspection, threading or further machining or fabricating. In such vibratory drive apparatus for parts feeder bowls, it is common to utilize a plurality of leaf springs attached to a base and to a bowl support at locations angularly spaced about the axis of the bowl, with the leaf springs extending at an acute angle to the vertical to resiliently mount the bowl support on the base for combined angular and axial oscillatory movement. A drive means such as an electromagnetic solenoid is commonly utilized to impart vibratory movement to the parts feeder bowl and difficulties have been encountered in "tuning" the spring to accommodate feeder bowls of different size and mass, as well as to adjust the relative spring rates of the different springs in each unit for uniform feeding. In addition, difficulties have also been encountered due to misalignment of the spring engaging faces on the mount for attaching the springs to the base and to the bowl support, which misalignment tends to cause stressing of the leaf springs when secured to the mounts and results in nonuniform and sometimes inadequate feeding of parts.

SUMMARY OF THE INVENTION

The present invention relates to a vibratory drive apparatus for a parts feeder bowl of the type wherein a plurality of leaf spring assemblies are attached to the base and bowl at locations spaced angularly about the axis of the bowl and with the leaf spring assemblies extending at an acute angle to the vertical to resiliently mount the bowl on the base for combined axial and oscillatory movement. The drive apparatus has an improved arrangement for mounting the springs on the base to enable adjustment of the effective lengths of the springs to accommodate feeder bowls of different size and mass and to also accommodate different size springs. The mountings for the leaf springs are also angularly adjustable about horizontal axes paralleling the planes of the springs to enable alignment of the spring engaging faces on the mounts with the leaf spring to avoid introduction of stresses in the springs when the leaf springs are secured to the mounts. The bowl drive apparatus is adapted to utilize a solenoid type drive and an improved mount for the solenoid and for the armature are provided.

An important object of this invention is to provide a vibratory drive apparatus for imparting angular and axial vibratory movement to a parts feeder bowl in which the effective length of the leaf springs which support the bowl can be adjusted to tune the drive apparatus for use with different parts feeder bowls and to also equalize feeding in all sectors of the feeder bowl.

Another object of this invention is to provide a vibratory drive apparatus for imparting axial and angular vibratory movement to a parts feeder bowl in which the spring mounts for attaching the leaf springs to the base are adjustable to effect alignment of the mounts with the plane of the leaf springs to avoid introduction of stresses in the leaf springs when attaching them to the base.

Another object of this invention is to provide a vibratory drive apparatus for a parts feeder bowl having an improved bowl support in which the bowl support arms are adjustable to effect alignment of the arms with the plane of the leaf springs.

Yet another object of this invention is to provide a vibratory drive apparatus for imparting angular and axial vibratory movement to a parts feeder bowl and which has an improved mounting for the electromagnetic solenoid and armature for driving the apparatus to facilitate adjustment and alignment of the air gap.

These and other objects, advantages and features of the present invention will be more fully understood by reference to the following detailed description when taken in connection with the accompanying drawings wherein:

FIG. 1 is a perspective view of a vibratory bowl type parts feeder apparatus embodying the present invention;

FIG. 2 is a plan view of the drive apparatus with the bowl removed;

FIG. 3 is a side elevational view of the vibratory drive apparatus;

FIG. 4 is a fragmentary sectional view taken on the plane 4—4 of FIG. 3 and showing the parts on a larger scale than FIG. 3;

FIG. 5 is a fragmentary sectional view taken on the plane 5—5 of FIG. 4; and

FIG. 6 is a fragmentary sectional view taken on the plane 6—6 of FIG. 3 and illustrating the parts on a larger scale than FIG. 3.

Referring now more specifically to the accompanying drawings there is shown a vibratory drive apparatus 10 for a parts feeder bowl 11, which drive apparatus is arranged to impart angular and axial vibratory movement to the feeder bowl. Such vibratory feeder bowls are commonly used to feed, orient, untangle, blend or sort small parts for manufacturing operations such as assembly, inspection, threading or further fabrication. The feeder bowl 11 is of conventional construction and includes a bottom wall 11a (FIG. 6) which usually slopes outwardly toward the side wall 11b and has a track or a ramp 11c spiraling upwardly around the inside of the side wall for conveying the parts form the feeder bowl. The size, shape and configuration of the feeder bowl and ramp will vary somewhat with different applications and the vibratory drive apparatus of the present invention is adapted for adjustment to accommodate different size feeder bowls as well as to obtain optimum and uniform feeding around the feeder bowl.

The drive apparatus for the feeder bowl includes a base 12, a bowl support 13, a plurality of leaf spring assemblies 14 attached to the base and bowl support at locations spaced angularly about the axis of the bowl support and extending between the bowl support and base at an acute angle to the vertical to resiliently mount the bowl support on the base for angular and axial oscillatory movement, and a drive means 15 for producing relative oscillatory movement between the bowl support and base. The base is formed with a rigid upstanding marginal side wall and is preferably of polygonal configuration to define a plurality of generally planar interconnected walls herein shown four in number and designated 12a–12d. While the base can be fabricated into any suitable manner as by welding separate wall sections together or by casting, it is conveniently formed from a section of box beam such as a 12 inches box beam of relatively heavy gauge having a wall thickness for example of the order of one-half inch. For reasons pointed out hereinafter, the base has upward extending slots 16 formed in the side walls and disposed at an acute angle to the vertical. One of the slots 16 is formed in each of the walls 12a–12d of the base and the slots are each inclined in the same direction from the vertical. The leaf spring assemblies 14 comprise one and preferably a pair of similar leaf springs 21. A leaf spring mounting block 22 is provided for mounting the lower end of each leaf spring assembly on the base, and each mounting block has a flat side face 22a arranged to engage the side of the leaf springs. The lower end portions of the leaf springs are adjustably clamped to the side face 22a of the respective spring mounting block by a clamp plate 23 that overlies the side of the leaf spring opposite the blocks and which is secured to the blocks by a clamp fastener such as a cap screw 24. In the preferred embodiment shown, a pair of leaf spring bars 21 are utilized in each leaf spring assembly and the cap screw rotatably extends through an opening in the clamp plate 23 and is threaded into an opening in the mounting block 22 at a location between the spring plates 21. The mounting blocks 22 are each vertically adjustably mounted on the side walls to enable adjustment of the effective length of the leaf springs 21, and the mounting blocks are also mounted for angular adjustment about a horizontal axis paralleling the side face 22a of the block to effect alignment of the side face with the respective one of leaf springs 21. This is effected by a block fastener means in the form of a cap screw 27 which slidably and rotatably extends through a respective one of the slots 16 in the side wall and is threaded into an end of one of the spring mounting blocks 22, as best shown in FIG. 4, to draw the end face 22b of the mounting blocks firmly against the side wall for clamping the mounting blocks in vertically and angularly adjusted positions. A thrust washer 28 is preferably interposed between the head of the cap screw and the side wall.

The bowl support 13 includes a rigid hub 31 having upstanding hub walls 31a–31d which preferably parallels the corresponding side walls 12a–12d of the base. The hub walls 31a–31d are preferably interconnected to form a rigid generally rectangular frame and may conveniently be formed from a section of square tubing, and a rigid plate 32 is secured as by welding to the lower end of the hub side walls. The bowl support also includes a plurality of separate bowl support arms, one for each spring assembly, and herein designated 33a–33b. The bowl support arms each have a side face 34 of planar configuration adapted to engage the leaf springs 21 and the upper ends of the leaf spring assemblies are clamped to the side face of the respective bowl support arm by clamp plates 35 that overlie the side of the leaf springs opposite the clamp blocks. Fasteners such as cap screws 36 rotatably extend through openings in the clamp plates 35 and are threaded into openings in the respective bowl support arm to secure the upper ends of the springs to the arms. The arms 33a–33b are formed separate from the hub and are attached to the hub for angular adjustment about a horizontal axis paralleling the side faces 34 of the arms to enable alignment of the side faces with the leaf springs. This is achieved by arm fasteners in the form of cap screws 38 that rotatably extend through openings 39 in the hub walls and are threaded into openings 41 in the inner ends of the arms to draw the end faces 34a of the arm against the respective side wall of the hub to lock the arm in an angularly adjusted position with the side face 34 of the arms paralleling the leaf springs. The feeder bowl 11 is clamped to the outer ends of the arms 33a–33 by clamps 42 having stepped bowl engaging faces 42a. The clamps are secured to the outer ends of the arms by fasteners such as cap screws 43 that rotatably extend through openings in the clamps and are threaded into axial openings in the outer ends of the arms so as to allow the clamps to rotate relative to the arms about an axis paralleling the side faces 34 of the arms for alignment of the clamps with the bowl rim, as best shown in FIGS. 1, 3 and 6. The feeder bowl may also be secured to the hub as by a bolt 45 that extends through an opening in the feeder bowl and through a spacer tube 46 and through an opening in the bottom plate 32 of the hub, as best shown in FIG. 6.

An electromagnetic drive is provided for the apparatus and it includes a solenoid having a laminated pole piece 51, shown in FIG. 2 as having a generally E-shaped configuration, with an energizing coil 52 disposed around the central leg of the pole piece. The solenoid pole piece defines a pole face 51a at the ends of the E-shaped laminations and, in the preferred embodiment shown, the solenoid pole piece is mounted on the side wall at a location spaced outwardly from the center of the bowl support, and with the pole face 51a generally upright. As best shown in FIG. 6, the pole piece has a mounting plate 53 secured thereto as by welding indicated at 54a, suitable spacers 54 of non-magnetic material being interposed between the pole piece laminations 51 and the mounting plate 53 to minimize magnetic shunting of the pole piece laminations by the mounting plate. The solenoid pole piece is secured to one of the side walls such as 12c by a pair of cap screws 56 which loosely extend through openings 57 in the side walls as shown in FIG. 6, and are threaded into the mounting plate 53 to draw the mounting plate toward the side wall. In order to adjust the air gap between the pole piece laminations and the armature, to be described hereinafter, a plurality of set screws, herein shown four in number and designated 58a–58 are threaded into the side wall and arranged to engage the mounting plate adjacent the four quadrants of the plate, as shown in FIG. 3. The set screws are independently adjustable so as to not only enable adjustment of the air gap, but to also adjust the inclination of the pole face 51a vertically and horizontally as required to obtain a uniform air gap with the solenoid armature described hereinafter.

An armature support bracket in the form of an elongated rigid bar 61 is rigidly secured to the hub and is conveniently secured as by welding to the lower hub plate 32. The armature support bracket 61 extends outwardly from the hub and has an armature 63, preferably of laminated construction as shown in FIG. 6, secured to the outer end of the support bracket. In the form shown, the armature laminations are secured to each other and to the support bracket 61 as by gusset plates 64 which are welded to the laminations and to the support bracket. As shown in FIGS. 2 and 6, the armature 63 overlies the pole face 51a and the pole face is adjustable in the manner previously described so as to achieve the proper air gap spacing between the armature and pole piece as well as to obtain a uniform air gap. As will be seen, the solenoid when energized by a suitable AC power source as through a cable 65, will cyclically electromagnetically attract the armature. Since the armature 63 is rigidly secured to the hub at a point spaced outwardly from the center of the hub, it produces a torsional oscillation of the hub and hence of the bowl support 13.

The leaf springs 21 are mounted to extend upwardly at an acute angle to the vertical so that the bowl support moves axially as it is angularly oscillated by the electromagnetic drive. As is well understood in the art, the angle of the springs can be varied over a relatively wide range from a very small angle of the order of 5° on up to relatively high angles of the order of 30° and 35°. The spring angle will vary somewhat depending on the type of parts being fed with relatively small spring angles being preferable for lightweight and delicate parts and higher spring angles preferable for large and heavy parts. In the embodiment shown, a spring angle of about 15° is utilized and will accommodate a wide range of different parts. The angle of the slots 16 in the housing side walls are selected in accordance with the desired spring angle so as to generally parallel the springs so that adjustment of the spring length does not change the effective spring angle.

The feeder bowl drive can be designed to either produce clockwise oscillation of the bowl support by the drive or counterclockwise oscillation, as desired. The drive illustrated in the drawings is arranged to produce clockwise oscillation and, as shown in FIG. 2, the solenoid and armature are mounted so that, when the solenoid is energized, it attracts the armature and produces a clockwise oscillation of the bowl support 13. As will be appreciated, the mounting of the solenoid on the base and the armature on the bowl support can be changed, for example with the solenoid positioned at the left-hand side instead of the right-hand side as shown in FIG. 2 and with the armature extending to the left of the hub instead of to the right as shown in FIG. 2, to produce counterclockwise oscillation. For the clockwise drive shown in the drawings, the slots 16 in the housing side walls 12a–12d are disposed at an angle designated a relative to the vertical plane measured in a clockwise direction from a vertical plane through the lower end of the slot, as viewed from the outer side of the wall. In the preferred form shown, the spring mounting blocks 22a–22d and the bowl support arms 33a–33d are disposed at the same side of the respective leaf spring assemblies and the slots 16 are offset to the left of center of the side walls at a position such that a longitudinal centerline through the slots intersects the longitudinal axis of the arms 33a–33d. Stated otherwise, the bowl support arms 33a33d extend substantially radially from the hub 31 and are angularly adjustable about a radial axis by the cap screws 38, which radial axis parallels the side face 34 of the arms to which the leaf springs are attached. The longitudinal centerline of the slot 16 intersects this adjustment axis of the arms when the arms are spaced a working distance as shown in FIG. 3 above the top of the base. For a counterclockwise drive, the slots 16 would be positioned to the right of the center of the respective side walls and angularly inclined at a similar angle a measured counterclockwise from a vertical plane through the lower ends of the slots and such that the longitudinal centerline of the slots will also intersect the longitudinal axis of the arms.

In initially setting up the drive apparatus, spacers (not shown) can be interposed between the bowl support arms and the base to uniformly space the bowl support above the base and the springs can be adjusted and tightened in their adjusted position. Thereafter, if it is desired to adjust the effective length of the springs, they can be individually adjusted by loosening the cap screws 27 which clamp the mounting blocks to the side walls and by also loosening the cap screws 24 that clamp the leaf springs to the side face of the mounting blocks. The mounting blocks can then be adjusted vertically along the slots 16 to increase or decrease the effective length of the springs, with the longer effective lengths being utilized for lightweight feeder bowls and shorter effective lengths being utilized for the heavier feeder bowls. Then, the springs can be first locked to the mounting blocks by tightening the screws 24 so as to assure alignment of the side faces of the clamping blocks with the springs and by thereafter tightening the cap screws 27 to secure the mounting blocks in vertically and angularly adjusted positions. As will be seen, the arms 34 are also angularly adjustable about the axis of the cap screws 38, which axis parallels the side face 34 of the bowl support arms and is preferably coaxial with the arms. In this manner, the side faces 34 of the arms can align with the leaf springs, when the leaf springs are clamped to the side face. The cap screws 38 which secure the arms to the hub can thereafter be tightened to lock the arms in their angularly adjusted position. Since the arms and mounting blocks are self-aligning with the leaf springs, they do not impose bending or other nonuniform stresses in the leaf springs which could adversely effect the uniformity of feeding of the apparatus. The drive apparatus can be tuned to accommodate different bowl weights and different length arms can be utilized to adapt the drive apparatus for bowls of widely different size. In addition, leaf spring assemblies 21 of different stiffness can be substituted if desired when adapting the drive apparatus to bowls of widely different size and weight. Since the lower portions of the leaf springs are adjustably clamped to the mounting blocks and the mounting blocks are themselves adjustably clamped to the side walls, it will be seen that adjustment of the effective lengths of the springs can be achieved without changing the vertical height of the feeder bowl support structure.

While a preferred embodiment of the feeder bowl drive apparatus has been herein illustrated and described, it will be understood that the invention may be embodied in other forms within the scope of the following claims.

The embodiments of the invention in which an exclusive property or privilege is claimed are defined as follows:

1. In a vibratory drive apparatus for imparting angular and axial vibratory movement to a parts feeder bowl, the drive apparatus including a base, a bowl support, a plurality of leaf spring assemblies attached to the base and bowl support at locations spaced angularly about an upright axis of the bowl support, the leaf spring assemblies each extending between the bowl support and base at an acute angle to the vertical to resiliently mount the bowl support on the base for combined angular and axial oscillatory movement, and drive means operatively connected to the bowl support and base for producing relative oscillatory movement therebetween, the improvement wherein the base has a rigid upstanding marginal side wall and upwardly extending slots in the side wall at spaced locations therearound, a plurality of spring mounting blocks each extending laterally from the side wall of the base adjacent a respective one of the slots therein and having a side face extending transverse to the side wall of the base, means carried by the spring mounting blocks for clamping a respective one of the leaf spring assemblies to the side face on the spring mounting block, and block fastener means individual to each spring mounting block, said block fastener means extending through one of the slots into an end of the spring mounting block to mount the block on the side wall for vertical adjustment along a respective one of the slots and for angular adjustment about a horizontal axis paralleling the side face on the block, said fastener means being operative when tightened to lock the spring mounting blocks to the side wall in vertical and angular adjusted position along the slots with the side face on the blocks paralleling the respective leaf spring assembly.

2. A drive apparatus according to claim 1 wherein said slots in the side wall of the housing generally parallel respective ones of said leaf spring assemblies.

3. A drive apparatus according to claim 2 wherein said bowl support includes a hub and a plurality of separate bowl support arms each having a spring engaging face along one side thereof, means for clamping the leaf spring assemblies to said spring engaging faces on the arms, arm fastener means mounting the inner end of each arm on the hub for angular adjustment about a horizontal axis paralleling said side face of the arms and for locking the arms to the hub with said side face thereof paralleling said leaf spring assemblies, and means on said arms adjacent their outer ends for clamping a feeder bowl to the arms.

4. A drive apparatus according to claim 3 wherein said drive means includes an electromagnetic solenoid mounted on said base and defining a generally upright pole face spaced outwardly of the center of the hub, an armature support bracket rigidly secured to said hub and extending outwardly therefrom, and a solenoid armature on said bracket spaced outwardly from the center of said hub and in overlying relation to said pole face and operative upon energization of the solenoid to impart torsional oscillation to said hub.

5. A drive apparatus according to claim 3 wherein the spring mounting block and the bowl support arm associated with each leaf spring are disposed on the same side of that leaf spring and said horizontal adjustment axis of the bowl support arm substantially intersects the longitudinal centerline of the respective slot when the leaf spring parallels the slot.

6. A drive apparatus according to claim 1 wherein spring mounting blocks extend laterally inwardly of said side wall of said base, said leaf springs being located inwardly of said side wall of the base.

7. In a vibratory drive apparatus for imparting angular and axial vibratory movement to a parts feeder bowl, the drive apparatus including a base, a bowl support, a plurality of leaf spring assemblies attached to the base and bowl support at locations spaced angularly about an upright axis of the bowl support, the leaf spring assemblies each extending between the bowl support and base at an acute angle to the vertical to resiliently mount the bowl support on the base for combined angular and axial oscillatory movement, and drive means operatively connected to the bowl support and base for producing relative oscillatory movement therebetween, the improvement wherein said bowl support includes a hub and a plurality of separate bowl support arms each having a spring engaging face along one side thereof, means for clamping the upper ends of said leaf springs to the spring engaging face on a respective one of said arms, arm fastener means securing the inner ends of said arms to said hub for angular adjustment of the arms about a horizontal axis generally paralleling said spring engaging face to facilitate alignment of the spring engaging face with the leaf springs, and means on the outer ends of said arms for clamping a parts feeder bowl to the bowl support arms.

8. A drive apparatus according to claim 7 wherein said hub has a rigid upstanding marginal hub wall and openings at spaced locations therearound, said arm fastener means extending through said openings in said hub wall and into the inner end of a respective one of the bowl support arms for locking the inner ends of the arms to the hubs with the spring engaging faces on the arms paralleling the respective leaf springs.

9. A drive apparatus according to claim 7 wherein said drive means includes an electromagnetic solenoid mounted on said base and defining a generally upright pole face spaced outward from the axis of the bowl support, an armature support bracket rigidly secured to said hub and extending outwardly therefrom, and a solenoid armature on said bracket spaced outwardly from the center of the hub and in overlying relation to said pole face and operative upon energization of the solenoid to impart torsional oscillation to said hub.

10. A drive apparatus according to claim 9 wherein said solenoid has a mounting plate rigidly secured thereto and generally paralleling said pole face, said housing having openings extending through the side wall and headed fastener means extending through said openings and threaded into said mounting plate for drawing the mounting plate toward the side wall, and a plurality of adjusting screws threadedly mounted on the side wall and engageable with said mounting plate at spaced locations to adjustably limit movement of the mounting plate toward the side wall for adjusting the air gap between the solenoid pole face and said armature.

* * * * *